United States Patent [19]

Dean, II et al.

[11] 4,242,224
[45] Dec. 30, 1980

[54] COLOR STABILIZATION OF AMINE ANTIOXIDANT AND ANTIOZONANT EMULSIONS

[75] Inventors: Paul R. Dean, II, Cuyahoga Falls; Joseph A. Kuczkowski, Munroe Falls, both of Ohio

[73] Assignee: The Goodyear Tire & Rubber Company, Akron, Ohio

[21] Appl. No.: 67,593

[22] Filed: Aug. 17, 1979

Related U.S. Application Data

[63] Continuation-in-part of Ser. No. 944,686, Sep. 22, 1978, abandoned.

[51] Int. Cl.$^3$ .............................................. C09K 15/26
[52] U.S. Cl. .................................... 252/402; 252/401; 252/403; 252/312; 260/45.9 R; 260/799
[58] Field of Search ............... 252/402, 403, 401, 312; 260/45.9 R, 799

[56] References Cited

U.S. PATENT DOCUMENTS

| 3,507,826 | 4/1970 | Lal et al. | 252/401 |
| 3,530,076 | 9/1970 | Sparks et al. | 252/401 |
| 3,542,691 | 11/1970 | Budd et al. | 252/401 |
| 3,702,331 | 11/1972 | Sike | 252/401 |

Primary Examiner—Benjamin R. Padgett
Assistant Examiner—J. L. Barr
Attorney, Agent, or Firm—J. Y. Clowney

[57] ABSTRACT

Pink discoloration in amine antioxidant and antiozonant emulsions utilized in the latex industry at high pH has been prevented or retarded by the addition of stabilizers selected from dialkylhydroxylamines or mercaptans. These stabilizers are added at a ratio of from 0.1 to 5 parts by weight per 100 parts by weight of the age resister. In addition, a reversal of discoloration in a liquid amine antioxidant has been achieved by mixing the same type of stabilizer directly with the antioxidant.

7 Claims, No Drawings

COLOR STABILIZATION OF AMINE ANTIOXIDANT AND ANTIOZONANT EMULSIONS

This application is a continuation in part of application Ser. No. 944,686, filed Sept. 22, 1978, which is now abandoned.

TECHNICAL FIELD

This invention pertains to antioxidants and antiozonants which are of particular use in the rubber industry. More particularly it pertains to the color stabilization of these age resisters.

Antioxidants and antiozonants are commonly added directly to dry rubber (e.g. SBR, NR, CR, NBR) during mixing of the given product formulation. Emulsions of antioxidants and antiozonants are convenient for the incorporation of these protective chemicals into latex emulsions (e.g. SBR, NBR, CR, latices). Discoloration of the antioxidant and/or antiozonant prior to mixing or incorporation results in undesirable tinting of the resulting product and detracts from the aesthetic value of the antioxidant or antiozonant. Although discoloration in the final product as it ages is possibly acceptable, discoloration of the amine age resister or its emulsion during storage is not desirable, since it indicates chemical changes within the age resister itself. Thus, it is desirable to increase the storage life of these age resisters and age resister emulsions by stabilizing them against chemical changes and the resultant color changes.

It is theorized that the change in color results from oxidation promoted by heat, light and high pH and is caused by free radical formation within the amine antioxidant. The high pH is frequently encountered during emulsification since it is desirable to match emulsion pH to latex pH to avoid destabilization of either system.

BACKGROUND

The investigation which led to this invention was directed particularly toward stabilizing an emulsion of a liquid (i.e. liquid at room temperature) p-styrenated diphenylamine antioxidant with the following formula:

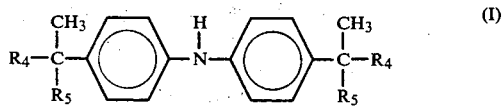

(I)

wherein $R^4$ is selected from phenyl and p-tolyl radicals and $R^5$ is selected from H and methyl, which changes from its normal creamy white color to a light pastel pink after long storage. The particular styrenated diphenylamine used was Wingstay 29, a trademark of the Goodyear Tire & Rubber Company.

A typical prior art Wingstay 29 emulsion recipe may be found in "Tech Book Facts, Wingstay 29 Anitoxidant in SBR Foam Compounds" a data sheet published by The Goodyear Tire & Rubber Company. Formula 3 of that data sheet is as follows:

|  | Parts by Weight |
| --- | --- |
| Wingstay 29 | 100.00 |
| Oleic Acid | 5.00 |
| 5% KOH | 20.00 |
| $H_2O$ | 75.00 |

An emulsion of the above composition can be made as follows:

1. heat the liquid antioxidant to 120°–140° F. to reduce viscosity,
2. add oleic acid,
3. with vigorous agitation, add the KOH (potassium hydroxide) solution slowly, and
4. add the water after inversion has occurred. Inversion is the change from a liquid organic phase in an aqueous phase to an emulsified organic phase in an aqueous phase.

A variety of organic and inorganic chemicals were tested to halt the color formation. The addition of sodium borohydride, sodium hydrosulphite, or citric acid (all reducing agents) destroyed the emulsion. Sodium tetrasulfide, an oxidizing agent caused an immediate yellowing and also destroyed the emulsion. The addition of sodium dimethyldithiocarbonate caused an immediate pinking of the emulsion. Some of the materials which did not affect the change in color were: sodium mercaptobenzothiazole, sodium sulfide, trimethyleneglycol, triisopropanolamine, and sodium nitrite.

After discovery of a class of additives which inhibit and/or reduce color changes in Wingstay 29 emulsions at high pH, experiments were carried out with other protective materials, and the class of compounds amenable to this treatment was broadened to include not only those age resisters similar to Wingstay 29 but also the following age resisters: alkylated diphenyl amine derivatives (semi-staining antioxidants) having the formula:

(II);

wherein $R_1$ and $R_2$ are alkyl radicals having 2 to 12 carbon atoms (2–12C); N-phenyl, N-alkyl-p-phenylenediamines (staining antiozonants) having the formula:

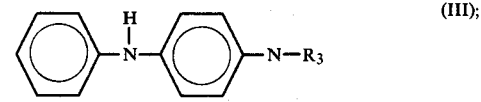

(III);

wherein $R_3$ is an alkyl radical (2–8C); and dihydroquinolines (staining antioxidants) having the formula:

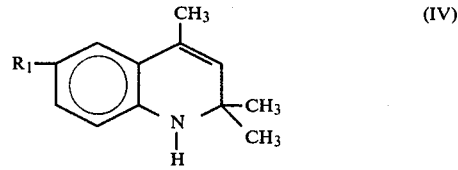

(IV)

wherein $R_1$ is an alkyl radical having 2 to 12 carbon atoms (2–12C):

By the same method of testing, it was learned that the following type of age resisters are not amenable to this treatment:

1. the high temperature reaction product of diphenylamine and acetone, obtained as BLE, a trademark of Uniroyal, Inc.; and
2. N, N'-di-alkyl-p-phenylenediamines (e.g. N,N'-bis (1-ethyl-3-methylpentyl)-p-phenylene diamine).

Further experiments have demonstrated that color improvements can be achieved in the amine age resisters themselves as well as in their emulsions.

DISCLOSURE OF INVENTION

Detrimental color changes in age resisters and their emulsions have been inhibited and/or reduced as well as reversed by combining with the age resister:

1. a reducing agent which is also a hydrogen donor selected from the group consisting of:
    a. dialkyl hydroxylamines (2–12C), and
    b. mercaptans selected from the group consisting of alkyl, phenyl, and aralkyl mercaptans,
2. at a ratio of from 0.1 to 5 parts by weight reducing agent per 100 parts by weight age resister.

As to emulsions, such variables as viscosity, the particular surfactant used, and percent solids concentration are not critical to this improvement. Such factors as the surfactant and the percent solids are chosen to make the emulsion compatible and easily miscible with the latex with which it is to be mixed.

Typical latices to which the age register emulsions are added are: styrene butadiene rubber (SBR), acrylonitrile butadiene rubber (NBR), butyl latex, polychloroprene latex, and acrylic rubber latex.

The color-stabilized age resisters may also be added directly to dry rubber forms of the above polymers during normal compounding procedures.

As to stabilization of the age resisters themselves, the reducing agent must be soluble in the given age resister or the two rendered compatible by the use of a mutual solvent. The particular mutual solvent used is not critical to this invention, so long as it does not adversely affect the age resister or the polymer to which it is to be applied.

It has been found that discolored Wingstay 29 for example, can be returned to its original light yellow color by the addition of dodecylmercaptan in concentrations as low as 0.10 percent. This is not intended to imply that 0.10 percent is the preferred concentration, only that the dodecylmercaptan is effective at low levels.

BEST MODE FOR CARRYING OUT THE INVENTION

If the reducing agent used is a mercaptan it is preferable to use one which has a high molecular weight (12 c or more) thereby reducing the objectionable odor often associated with mercaptans, Because of this possible odor problem, dialkylhydroxylamines are the preferred reducing agents. A preferred dialkyl hydroxylamine is diethylhydroxylamine, and a preferred mercaptan is lauryl mercaptan.

A preferred range for the ratio of reducing agent to age resister is from 0.5 to 4 parts by weight reducing agent to 100 parts by weight age resister.

The Wingstay 29, p-styrenated diphenylamine utilized in developing this invention has the formula

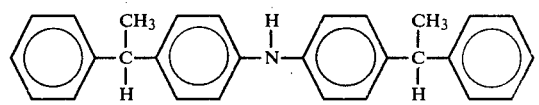

It is a viscous liquid with a specific gravity of 1.08 and a vapor pressure less than one mm Hg at 20° C.

The invention will be further clarified by a consideration of the following examples, which are intended to be purely exemplary. Unless otherwise stated, parts are parts by weight and percentages are by weight.

EXAMPLE I

An emulsion was made according to the table which follows:

| ANTIDEGRADENT EMULSION | |
|---|---|
| Ingredients | Parts |
| WINGSTAY 29 | 50.00 |
| 20% Potassium Oleate in water | 5.00 |
| Water | 24.75 |
| 85% Diethylhydroxylamine | 0.25 |
| 5% aqueous thickener* solution | 20.00 |

*Obtained as Alcogum 6625, a sodium-neutralized polyacrylate, from Alco Chemical Corp., Philadelphia, Pennsylvania.

The Wingstay 29 was heated to 49° to 55° C. to reduce the viscosity to insure good mixing. The potassium oleate was then added slowly to the Wingstay 29 with vigorous agitation. A thick emulsion was formed. Next, the water and diethylhydroxylamine were added to aid in mixing and homogenize the emulsion. Following homogenization, the thickener was added to reduce creaming tendencies. Creaming is a phase separation in emulsions. The resultant emulsion has been stable and has remained white for over a week; whereas, similar unstabilized emulsions would turn pink after two days.

EXAMPLE II

Wingstay 29 was heated to reduce viscosity and various levels of dodecylmercaptan were added including the range of 0.10 to 1.0 parts per 100 parts Wingstay 29. The two were stirred together and found to be compatible. The resulting samples were allowed to return to room temperature and within 24 hours the color of the mixtures improved from a dark tan to a light yellow color. Maintaining the mixture at 70° C., reduced the time required for the color improvement to occur.

Other embodiments of this invention will be apparent to those skilled in the art from a consideration of this specification or practice of the invention disclosed herein. It is intended that the specification and examples be considered as exemplary only, with the true scope and spirit of the invention being indicated by the following claims.

We claim:

1. A color-stabilized composition comprising a combination of:
    1. an amine age resister comprising an antioxidant or antiozonant selected from the group consisting of:
        a. p-styrenated diphenylamines having the formula:

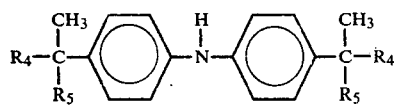

wherein $R_4$ is selected from phenyl and p-tolyl radicals, and $R_5$ is selected from H, and methyl;

b. alkylated diphenylamine derivatives having the formula:

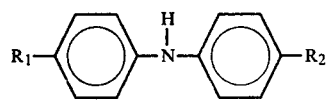

wherein $R_1$ and $R_2$ are alkyl radicals (2-12C);

c. N-phenyl, N'-alkyl-p-phenylenediamines having the following formula:

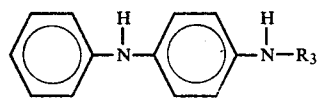

wherein $R_3$ is an alkyl radical (2-8C); and d. dihydroquinolines having the formula

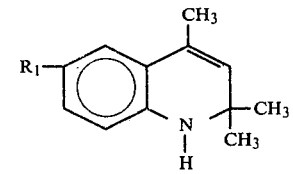

wherein $R_1$ is an alkyl radical having 2 to 12 carbon atoms (2-12C):

with:
2. a reducing agent which is also a hydrogen donor selected from the group consisting of:
 a. dialkylhydroxylamines (2-12C), and
 b. mercaptans selected from the group consisting of alkyl, phenyl, and aralkyl mercaptans,
3. at a ratio of from 0.1 to 5 parts by weight reducing agent per 100 parts by weight amine age resister.

2. The color-stabilized combination as recited in claim 1 wherein the amine age resister is a liquid p-styrenated diphenylamine having the formula

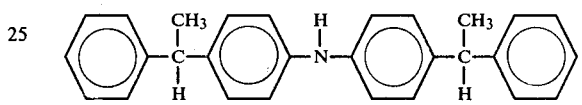

3. The color-stabilized combination as recited in claim 2 wherein the reducing agent is a mercaptan having 12 or more carbon atoms.

4. The color-stabilized combination of claim 3 wherein mercaptan is lauryl mercaptan.

5. The color-stabilized combination as recited in claim 2 which is in the form of an emulsion comprising the liquid amine age resister, water, an emulsifying surfactant, and the reducing agent.

6. The color-stabilized combination as recited in claim 5 wherein the reducing agent is a dialkylhydroxylamine (2-12C).

7. The color-stabilized combination as recited in claim 6 wherein the reducing agent is diethylhydroxylamine.

* * * * *